United States Patent [19]

Rieger et al.

[11] Patent Number: 5,397,505
[45] Date of Patent: Mar. 14, 1995

[54] LIQUID CRYSTALLINE MEDIUM

[75] Inventors: Bernhard Rieger, Yokohama; Hiroki Yoshitake, Atsugi, both of Japan; Thomas Jacob, Ober-Ramstadt, Germany; Herbert Plach, Darmstadt, Germany; Ulrich Finkenzeller, Plankstadt, Germany; Hans A. Kurmeier, Seeheim-Jugenheim, Germany

[73] Assignee: Merck Patent Gesellschaft mit beschrankter Haftung, Darmstadt, Germany

[21] Appl. No.: 182,303

[22] Filed: Jan. 18, 1994

Related U.S. Application Data

[63] Continuation of Ser. No. 776,223, Nov. 13, 1991, abandoned.

[30] Foreign Application Priority Data

Oct. 2, 1990 [EP] European Pat. Off. ........... 90118881
Feb. 16, 1991 [EP] European Pat. Off. ........... 91102214
May 29, 1991 [EP] European Pat. Off. ........... 91108842

[51] Int. Cl.$^6$ .................... C09K 19/20; C09K 19/12; C09K 19/30; G02F 1/13
[52] U.S. Cl. ................ 252/299.67; 252/299.63; 252/299.66
[58] Field of Search ............. 252/299.63, 299.66, 252/299.67

[56] References Cited

U.S. PATENT DOCUMENTS

| | | | |
|---|---|---|---|
| 4,110,243 | 8/1978 | Abert-Mellah et al. | 252/299.67 X |
| 4,340,498 | 7/1982 | Sugimori | 252/299.5 |
| 4,393,321 | 7/1983 | Misaki et al. | 560/73 |
| 4,487,954 | 12/1984 | Sugimori et al. | 560/107 |
| 4,528,115 | 7/1985 | Ishii et al. | 252/299.63 |
| 4,558,151 | 12/1985 | Takatsu et al. | 560/118 |
| 4,695,398 | 9/1987 | Goto et al. | 252/299.5 |
| 4,696,759 | 9/1987 | Isoyama et al. | 252/299.62 |
| 4,871,469 | 10/1989 | Reiffenrath et al. | 252/299.61 |
| 4,877,547 | 10/1989 | Weber et al. | 252/299.61 |
| 4,886,621 | 12/1989 | Sage et al. | 252/299.61 |
| 4,917,818 | 4/1990 | Sawada et al. | 252/299.61 |
| 4,923,632 | 5/1990 | Sawada et al. | 252/299.61 |
| 5,064,567 | 11/1991 | Funada et al. | 252/299.61 |
| 5,102,577 | 4/1992 | Uchida et al. | 252/299.01 |
| 5,122,295 | 6/1992 | Weber et al. | 252/299.01 |
| 5,167,860 | 12/1992 | Sawada et al. | 252/299.63 |
| 5,171,469 | 12/1992 | Hittich et al. | 252/299.01 |
| 5,178,790 | 1/1993 | Weber et al. | 252/299.01 |
| 5,286,411 | 2/1994 | Rieger et al. | 252/299.63 |
| 5,288,427 | 2/1994 | Weber et al. | 252/299.61 |

Primary Examiner—Robert L. Stoll
Assistant Examiner—C. Harris
Attorney, Agent, or Firm—Millen, White, Zelano, & Branigan

[57] ABSTRACT

The invention relates to a liquid-crystalline medium based on a mixture of polar compounds having positive dielectric anisotropy, characterized in that it contains one or more compounds of the general formula I

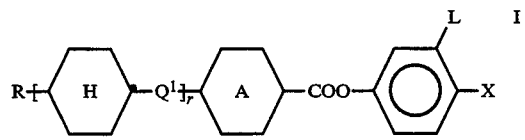

in which r is o or 1, $Q^1$ is —$CH_2CH_2$— or a single bond, A is 1,4-phenylene or trans-1,4-cyclohexylene, L is H or F, R is alkyl, alkoxy, oxaalkyl, fluoroalkyl or alkenyl, in each case having up to 7 carbon atoms and X is F, $CF_3$, or $OCF_2H$.

16 Claims, No Drawings

LIQUID CRYSTALLINE MEDIUM

This application is a continuation of application Ser. No. 07/776,223, filed Nov. 13, 1991, now abandoned.

The present invention relates to a liquid-crystalline medium, to the use thereof for electrooptical purposes, and to displays containing this medium.

BACKGROUND OF THE INVENTION

Liquid crystals are used, in particular, as dielectrics in display devices since the optical properties of such substances can be affected by an applied voltage. Electrooptical devices based on liquid crystals are extremely well known to those skilled in the art and may be based on various effects. Devices of this type are, for example, cells having dynamic scattering, DAP (deformation of aligned phases) cells, guest/host cells, TN cells having a twisted nematic structure, STN (super-twisted nematic cells, SBE (super-birefringence effect) cells and OMI (optical mode interference) cells. The most common display devices are based on the Schadt-Helfrich effect and have a twisted nematic structure.

The liquid-crystal materials must have good chemical and thermal stability and good stability toward electrical fields and electromagnetic radiation. Furthermore, the liquid-crystal materials should have low viscosity and give short addressing times, low threshold voltages and high contrast in the cells. Furthermore, they should have a suitable mesophase, for example, for the above-mentioned cells, a nematic or cholesteric mesophase, at customary operating temperatures, i.e. in the broadest possible range above and below room temperature. Since liquid crystals are generally used as mixtures of a plurality of components, it is important that the components are readily miscible with one another. Further properties, such as electrical conductivity, dielectric anisotropy and optical anisotropy, must meet various requirements depending on the cell type and the area of application. For example, materials for cells having a twisted nematic structure should have positive dielectric anisotropy and low electrical conductivity.

For example, the media desired for matrix liquid-crystal displays containing integrated nonlinear elements for switching individual image points (MLC displays) are those having high positive dielectric anisotropy, broad nematic phases, relatively low birefringence, very high specific resistance, good UV and temperature stability of the resistance and low vapor pressure.

Matrix liquid-crystal displays of this type are known. Examples of nonlinear elements which can be used to individually switch the individual image points are active elements (i.e. transistors) This is then referred to as an "active matrix" and a differentiation can be made between two types:

1. MOS (Metal Oxide Semiconductor) transistors on a silicon wafer as substrate.

2. Thin-film transistors (TFTs) on a glass plate as substrate.

The use of monocrystalline silicon as the substrate material limits the display size since even the modular assembly of various part displays results in problems at the joints.

In the case of the more promising type 2, which is preferred, the electrooptical effect used is usually the TN effect. A differentiation is made between two technologies: TFTs comprising compound semiconductors, such as, for example, CdSe, or TFTs based on polycrystalline or amorphous silicon. Intensive research efforts are being made worldwide in the latter technology.

The TFT matrix is applied to the inside of one glass plate of the display, while the inside of the other glass plate carries the transparent counterelectrode. Compared with the size of the image point electrode, the TFT is very small and hardly affects the image at all. This technology can also be extended to fully color-compatible image displays, where a mosaic of red, green and blue filters is arranged in such a manner that each filter element is located opposite a switchable image element.

The TFT displays usually operate as TN cells with crossed polarizers in transmission and are illuminated from the back.

The term MLC displays here covers any matrix display containing integrated nonlinear elements, i.e. in addition to the active matrix, also displays containing passive elements such as varistors or diodes (MIM=-metal-insulator-metal).

MLC displays of this type are particularly suitable for TV application (for example pocket TV sets) or for high-information displays for computer applications (laptops) and in automobile or aircraft construction. In addition to problems with respect to the angle dependency of the contrast and the switching times, problems result in MLC displays due to inadequate specific resistance of the liquid-crystal mixtures TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288, Matrix LCD Controlled by Double Stage Diode Rings, p. 141 ff., Paris; STROMER, M., Proc. Eurodisplay 84, September 1984: Design of Thin Film Transistors for Matrix Adressing of Television Liquid Crystal Displays, p. 145 ff., Paris. As the resistance decreases, the contrast of an MLC display worsens and the problem of "after image elimination" may occur. Since the specific resistance of the liquid-crystal mixture generally decreases over the life of an MLC display due to interaction with the internal surfaces of the display, a high (initial) resistance is very important to give acceptable service lives. In particular, in the case of low-voltage mixtures, it was hitherto not possible to achieve very high specific resistances. It is furthermore important that the specific resistance increases as little as possible with increasing temperature and after heating and/or exposure to UV radiation. The MLC displays of the prior art do not satisfy current demands.

Thus, there continues to be a great demand for MLC displays of very high specific resistance and at the same time a broad operating temperature range, short switching times and low threshold voltage which do not have these disadvantages or only do so to a lesser extent.

For TN (Schadt-Helfrich) cells, media are desired which facilitate the following advantages in the cells:

broadened nematic phase range (in particular down to low temperatures), switchability at extremely low temperatures (outdoor use, automobiles, avionics), increased stability to UV radiation (longer life).

The media available from the prior art do not make it possible to achieve these advantages whilst simultaneously retaining the other parameters.

For supertwisted (STN) cells, media are desired which facilitate a greater multiplexing ability and/or lower threshold voltages and/or broader nematic phase ranges (in particular at low temperatures). To this end, a further extension of the parameter latitude available (clearing point, smectic-nematic transition or melting point, viscosity, dielectric values, elastic values) is urgently desired.

The invention has the object or providing media, in particular for MLC, TN or STN displays of this type, which do not have the abovementioned disadvantages or only do so to a lesser extent, and preferably at the same time have very high specific resistance and low threshold voltages.

It has now been found that this object can be achieved if media according to the invention are used in displays.

SUMMARY OF THE INVENTION

The invention thus relates to a liquid-crystalline medium based on a mixture of polar compounds having positive dielectric anisotropy, characterized in that it contains one or more compounds of the general formula I

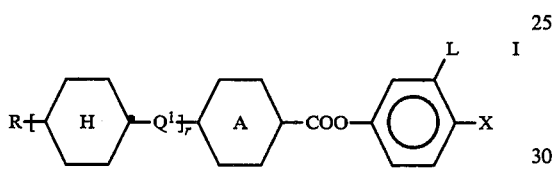

in which r is 0 or 1, $Q^1$ is —CH$_2$CH$_2$— or a single bond, A is 1,4-phenylene or trans-1,4-cyclohexylene, L is H or F, R is alkyl, alkoxy, oxaalkyl, fluoroalkyl or alkenyl, in each case having up to 7 carbon atoms and X is F, CF$_3$, OCF$_3$ or OCF$_2$H.

The invention also relates to electrooptical displays (in particular STN or MLC displays having two plane-parallel outer plates which, together with a frame, form a cell, integrated nonlinear elements for switching individual image points on the outer plates, and a nematic liquid-crystal mixture of positive dielectric anisotropy and high specific resistance located in the cell) which contain media of this type, and to the use of these media for electrooptical purposes.

DETAILED DESCRIPTION OF THE INVENTION

In particular the invention relates to a nematic liquid-crystal composition based on terminally and laterally fluorinated compounds, characterized in that it contains about 10 to 25% by weight of one or more compounds from group 1:

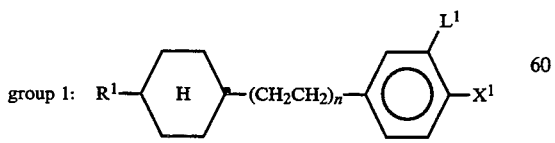

wherein $R^1$ denotes a straight-chain alkyl group of 1 to 12 carbon atoms, $L^1$ is H or F and $X^1$ is F, CF$_3$, OCF$_3$ or OCF$_2$H and n is 0 or 1, preferably 0, about 10 to 70% by weight of one or more compounds from group 2:

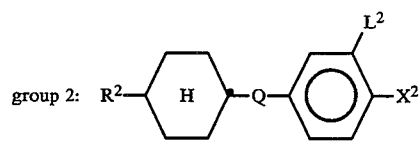

wherein $R^2$ denotes a straight-chain alkyl group of 1 to 12 carbon atoms $L^2$ is H or F, Q is

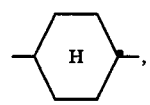

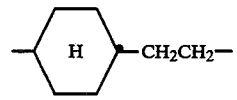

or

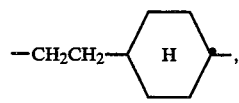

preferably

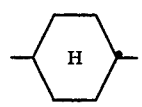

or

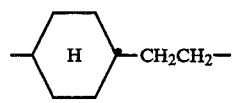

and $X^2$ is F, CF$_3$, OCF$_3$ or OCF$_2$H, about 5 to 40%, in particular 5 to 25% by weight of one or more compounds of the formula Ia.

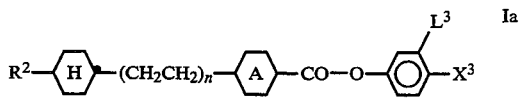

wherein $L^3$ is F or H, $X^3$ is F, CF$_3$, OCF$_3$ or OCF$_2$H, n is 0 or 1, preferably 0, and

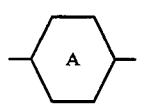

is

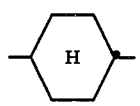

or

-continued

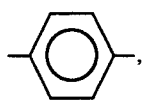

about 0 to 15% by weight of one or more compounds from group 4:

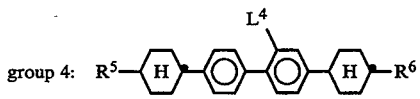

wherein $L^4$ is H or F, about 0 to 25% by weight of one or more compounds from group 5:

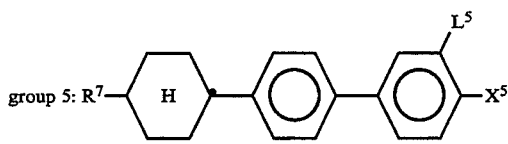

wherein $R^3$ to $R^7$ each independently denotes a straight-chain alkyl group of 1 to 12 carbon atoms, $L^5$ is H or F and $X^5$ is F, $CF_3$, $OCF_3$ or $OCF_2H$, and about 0 to 20% by weight of one or more compounds from group 6:

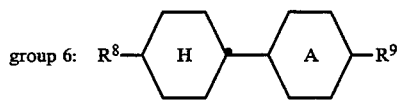

wherein

has the meaning given for formula Ia, and $R^8$ and $R^9$ are each independently alkyl or alkoxy groups with one to 12 C atoms, which is highly suited for AMD application. Very high RC time values can be obtained in such AMDs. These compositions also show a reduced viscosity, allow operation in AMDs in the first minimum of transmission and do not exhibit any crystallization over 1000 hrs at −30° C.

Such compositions preferably contain at least two compounds of group 1 wherein $R^1$ is n-pentyl, n-hexyl and n-heptyl.

In a preferred embodiment the inventive nematic composition contains about 15 to 20% by weight of two or more compounds from group 1, wherein $L^1$ is H and $X^1$ is F, $CF_3$ or $OCF_3$, about 10 to 40% by weight of two or more compounds from group 2, wherein $L^2$ is H, $X^2$ is $OCF_3$ and m is 0 and about 10 to 40% by weight of two or more compounds from group 2 wherein $L^2$ is H or F, $X^2$ is F or $OCF_3$ and m is 1, about 5 to 15% by weight of two or more compounds of formula Ia wherein $L^3$ is H and $X^3$ is F and/or about 5 to 15% by weight of two or more compounds of formula Ia wherein $L^3$ is H and $X^3$ is $OCF_3$, additionally the group 6 may contain 0–25% by weight of one or more compounds of the formula

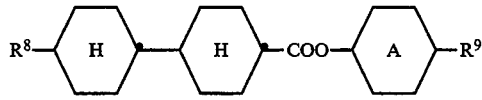

in which

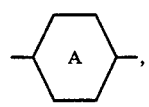

$R^8$ and $R^9$ have the meaning given for group 6.

The compounds from groups 1 to 6 are known from the German Patents 26 36 684 and 31 02 017, the European Patent 0 051 738 and 0 125 653, the International Patent Application WO 89/02884 and U.S. Pat. Nos. 4,302,352, 4,710,315 and 4,419,264 or can be prepared in analogy to known compounds.

The preparation of the compositions according to the invention is effected in the conventional manner. In general, the desired amount of the components which is used in the smaller amount is dissolved in the components which constitutes the main constituent, preferably at elevated temperature. If this temperature is chosen to be above the clear point of the main constituent, the completeness of the process of dissolving can be observed particularly easily.

The liquid-crystal mixtures according to the invention facilitate a significant broadening of the parameter latitude available.

The achievable combinations of clearing point, viscosity at low temperature, thermal and UV stability and dielectric anisotropy are far superior to previous materials from the prior art.

The requirement for a high clearing point, a nematic phase at −40° C. and a high Δε was previously only achievable to an unsatisfactory extent. Although systems such as, for example, ZLI-3119 have a comparable clearing point and comparatively favorable viscosities, they have, however, a Δε of only +3.

Other mixture systems have comparable viscosities and values of Δε, but only have clearing points in the region of 60° C.

The liquid-crystal mixtures according to the invention make it possible to achieve, at low viscosities at low temperatures (at −30° C.≦600, preferably ≦550 mPa.s; at −40° C. ≦1800, preferably ≦1700mPa.s), simultaneously dielectric anisotropy values Δε≧3.5, preferably ≧4.0, clearing points above 65°, preferably above 70°, and a high value for the specific resistance, which means that excellent STN and MLC displays can be achieved.

It goes without saying that a suitable choice of the components of the mixtures according to the invention also allows higher clearing points (for example above 90°) to be achieved at higher threshold voltages or lower clearing points to be achieved at lower threshold voltages while retaining the other advantageous properties. The MLC displays according to the invention preferably operate in the first transmission minimum of Gooch and Tarry [C. H. Gooch and H. A. Tarry, Electron. Lett. 10, 2-4, 1974; C. H. Gooch and H. A. Tarry, Appl. Phys., Vol. 8, 1575-1584, 1975], in this case, a lower dielectric anisotropy in the second minimum is sufficient in addition to particularly favorable electro-optical properties, such as, for example, high gradient of the characteristic line and low angle dependency of the contrast (German Patent 30 22 818) at the same threshold voltage as in an analogous display. This allows significantly higher specific resistances to be achieved in the first minimum using the mixtures according to the invention than using mixtures containing cyano compounds. A person skilled in the art can use simple routine methods to produce the birefringence necessary for a prespecified cell thickness of the MLC display by a suitable choice of the individual components and their proportions by weight.

The viscosity at 20° C. is preferably ≦25 mPa.s. The nematic phase range is preferably at least 70°, in particular at least 80°. This range preferably extends at least from −30° to +70° more preferred from −30° to 120°.

Measurements of the "voltage holding ratio" (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention containing compounds of the formula I exhibit a considerably smaller decrease in the HR with increasing temperature than do analogous mixtures in which the compounds of the formula I are replaced by cyanophenylcyclohexanes of the formula The UV stability of the mixtures according to the invention is also considerably better, i.e. they exhibit a significantly smaller decrease in the HR on exposure to UV radiation and/or high temperatures of e.g. 100°.

The media according to the invention are distinguished by favorable viscosity values in addition to an unusually broad nematic phase range, resulting, in particular when used in STN displays, in significant advantages over prior-art media.

The media according to the invention are preferably based on a plurality (preferably two or more) of compounds of the formula I, i.e. the proportion of these compounds is ≧25%, preferably ≧40%.

The individual compounds of the formulae I to XIV and their sub-formulae which can be used in the media according to the invention are either known or can be prepared analogously to the known compounds.

Preferred embodiments are indicated below:
a medium additionally contains one or more compounds selected from the group comprising the general formulae II, III and IV:

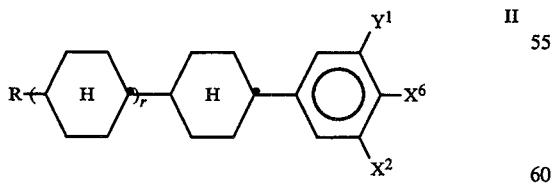

II

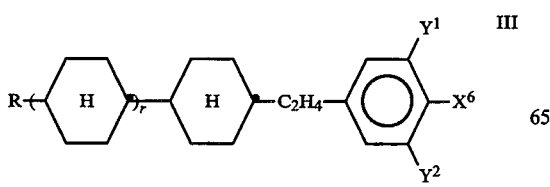

III

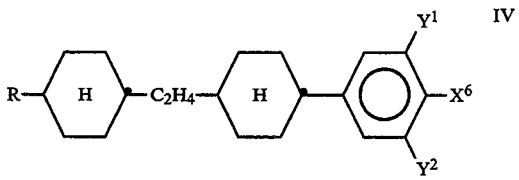

IV in which the individual radicals are as defined below:

R: alkyl, oxaalkyl, fluoroalkyl or alkenyl, in each case having up to 7 carbon atoms $X^6$: F, Cl, $CF_3$, $OCF_3$ or $OCHF_2$ $Y^1$ and $Y^2$: in each case, independently of one another, H or F r: 0 or 1.

a medium additionally contains one or more compounds selected from the group comprising the general formulae V to VIII.

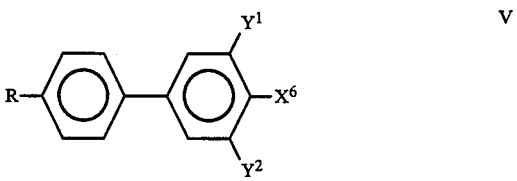

V

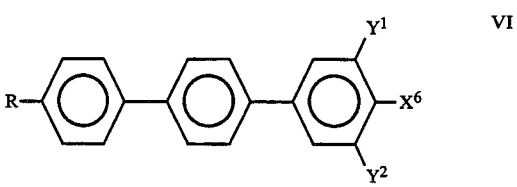

VI

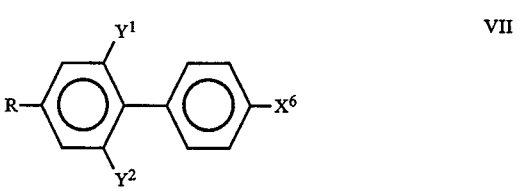

VII

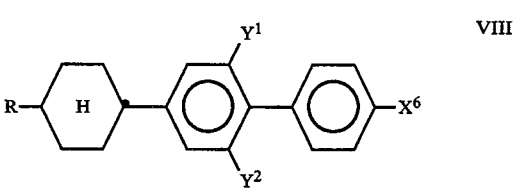

VIII in which R, $X^6$ and $Y^1$ and $Y^2$ are each, independently of one another, as defined in claim 2.

a medium additionally contains one or more compounds selected from the group comprising the general formulae IV to XV:

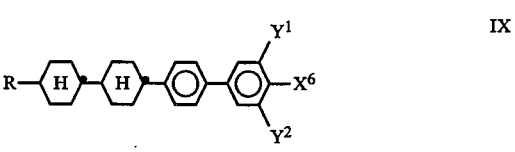

IX

-continued

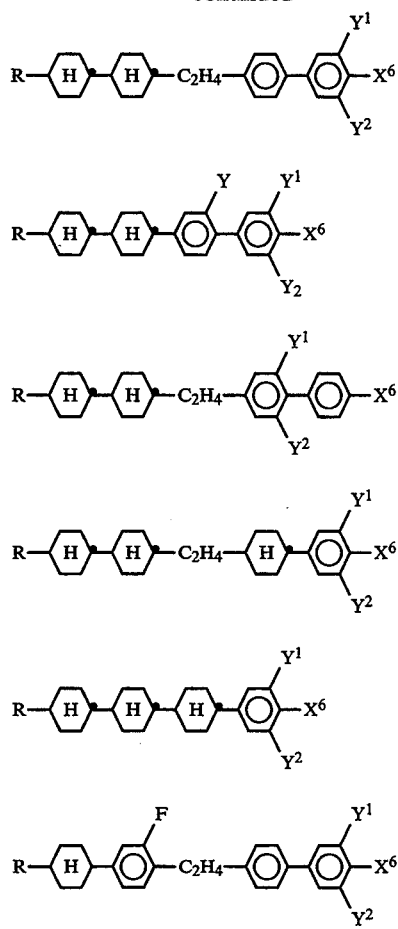

in which R, $X^6$ and $Y^1$ and $Y^2$ are each, independently of one another, as defined in claim 2.
The proportion of compounds of the formulae I to IV together is at least 50% by weight in the total mixture
the proportion of compounds of the formula I is from 10 to 50% by weight in the total mixture
the proportion of compounds of the formulae II to IV is from 30 to 70% by weight in the total mixture

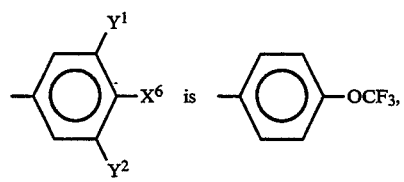

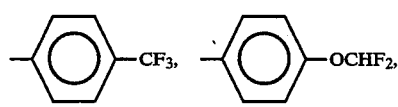

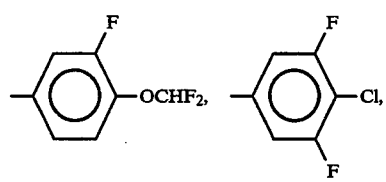

-continued

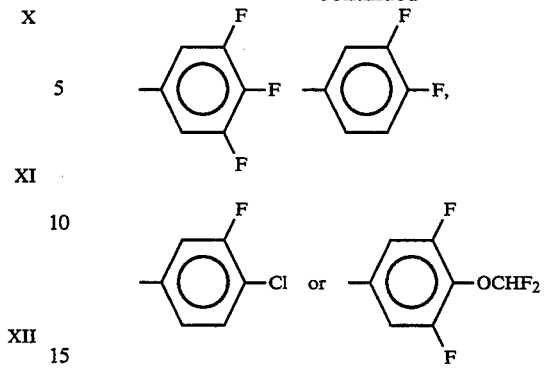

the medium contains compounds of the formulae II and III or IV
R is straight-chain alkyl or alkenyl having 2 to 7 carbon atoms
the medium essentially comprises compounds of the formulae I to IV
the medium contains further compounds, preferably selected from the following group:

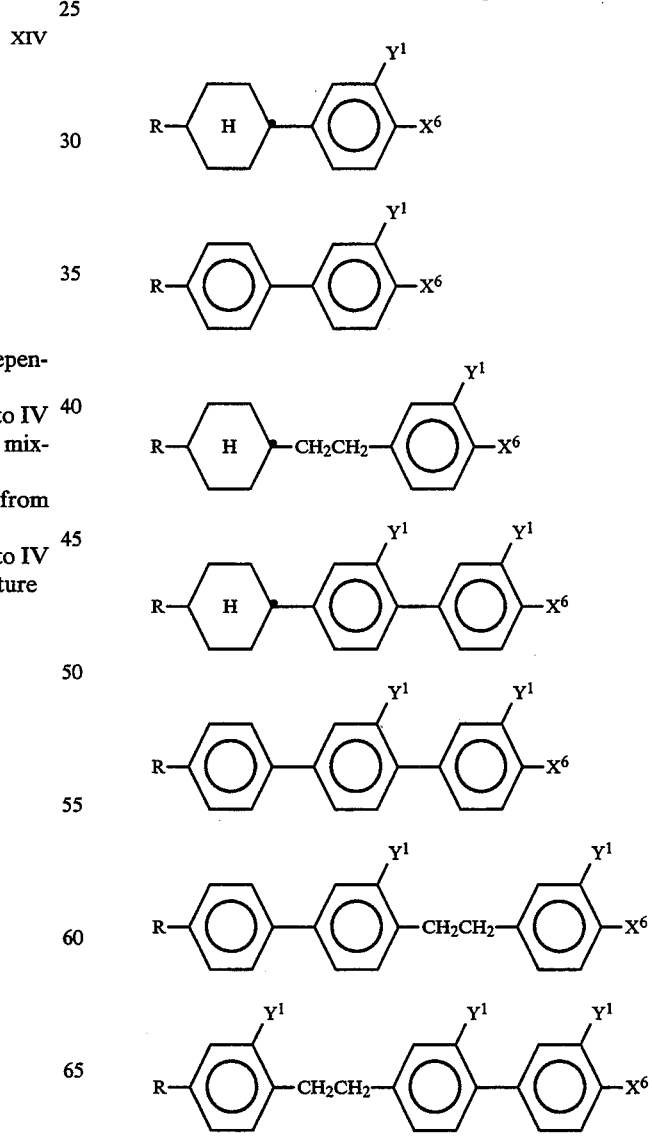

The I: (II+III+IV) weight ratio is preferably from 1:4 to 1:1.

The medium essentially comprises compounds selected from the group comprising the general formulae I to XIV.

It has been found that even a relatively small proportion of compounds of the formula I mixed with conventional liquid-crystal materials, but in particular containing one or more compounds of the formula II, III and/or IV, results in a significant improvement in the addressing times, in significantly lower values for the birefringence, and in low threshold voltages, and at the same time broad nematic phases with low smectic-nematic transition temperatures are observed. The compounds of the formulae I to IV are colorless, stable and readily miscible with one another and with other liquid-crystal materials.

The term "alkyl" covers straight-chain and branched alkyl groups having 1-7 carbon atoms, in particular the straight-chain groups methyl, ethyl, propyl, butyl, pentyl, hexyl and heptyl. Groups having 2-5 carbon atoms are generally preferred.

The term "alkenyl" covers straight-chain and branched alkenyl groups having 2-7 carbon atoms, in particular the straight-chain groups. Preferred alkenyl groups are $C_2$-$C_7$1E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups containing terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term alkoxy preferably covers straight-chain radicals of the formula $C_nH_{2n+1}$—O—, in which n is 1 to 6.

The term "oxaalkyl" preferably covers straight-chain radicals of the formula $C_nH_{2n+1}$—O—$(CH_2)_m$, in which n and m are each, independently of one another, from 1 to 6. n is preferably 1 and m is preferably from 1 to 6.

Through a suitable choice of the meanings of R, X and Y, the addressing times, the threshold voltage, the gradient of the transmission characteristic lines, etc., can be modified as desired. For example, 1E-alkenyl radicals, 3E-alkenyl radicals, 2E-alkenyloxy radicals and the like generally give shorter addressing times, improved nematic tendencies and a higher ratio between the elastic constants $K_{33}$ (bend) and $k_{11}$ (splay) compared with alkyl and alkoxy radicals. 4-Alkenyl radicals, 3-alkenyl radicals and the like generally give lower threshold voltages and lover values of $k_{33}/k_{11}$ compared with alkyl and alkoxy radicals. A —$CH_2CH_2$— group in $Z^1$ or $Z^2$ generally results in higher values of $k_{33}/k_{11}$ compared with a simple covalent bond. Higher values of $k_{33}/k_{11}$ facilitate, for example, flatter transmission characteristic lines in TN cells with a 90° twist (for achieving gray tones) and steeper transmission characteristic lines in STN, SBE and OMI cells (greater multiplexing ability), and vice versa.

The optimum mixing ratios of the compounds of the formulae I and II+III+IV depends substantially on the desired properties, on the choice of the components of the formulae I, II, III and/or IV and on the choice of any other components which may be present. Suitable mixing ratios within the abovementioned range can easily be determined from case to case.

The total amount of compounds of the formulae I to XII in the mixtures according to the invention is not crucial. The mixtures may therefore contain one or more further components in order to optimize various properties. However, the effect observed on the addressing times and the threshold voltage is generally greater the higher the total concentration of compounds of the formulae I to XIV.

In a particularly preferred embodiment, the media according to the invention contain compounds of the formula II, III, V and/or VII (preferably II and/or III) in which $X^6$ is $CF_3$, $OCF_3$ or $OCHF_2$. A favorable synergistic effect with the compounds of the formula I results in particularly advantageous properties.

For STN applications, the media preferably contain compounds selected from the group comprising the formulae V to VIII in which $X^6$ is preferably $OCHF_2$.

The media according to the invention may furthermore contain a component A comprising one or more compounds of the general formula I' having a dielectric anisotropy of from −1.5 to +1.5.

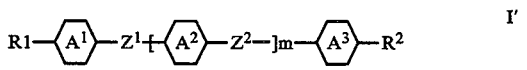

in which $R^1$ and $R^2$ are each, independently of one another, n-alkyl, n-alkoxy, o-fluoroalkyl or n-alkenyl having up to 9 carbon atoms, the rings $A^1$, $A^2$ and $A^3$ are each, independently of one another, 1,4-phenylene, 2- or 3-fluoro-1,4-phenylene, trans-1,4-cyclohexylene or 1,4-cyclohexenylene, $Z^1$ and $Z^2$ are each, independently of one another, —$CH_2CH_2$—, —C≡C—, —CO—O—, —O—CO— or a single bond, and m is 0, 1 or 2.

Component A preferably contains one or more compounds selected from the group comprising II1 to II7:

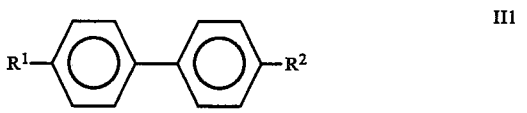

II1

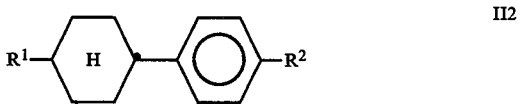

II2

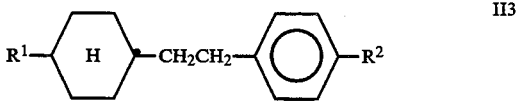

II3

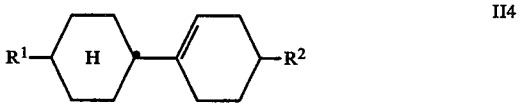

II4

-continued

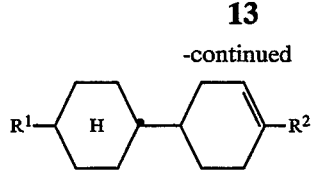  II5

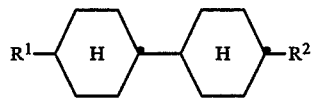  II6

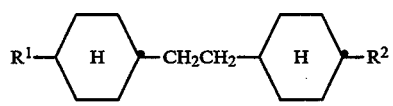  II7 in which R¹ and R² are as defined under formula I'.

Component A preferably additionally contains one or more compounds selected from the group comprising II8 to II20:

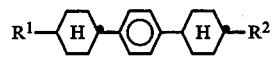  II8

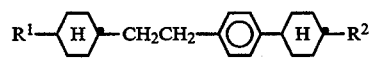  II9

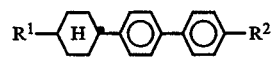  II10

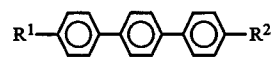  II11

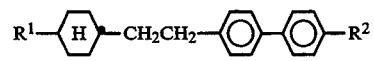  II12

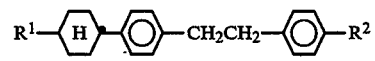  II13

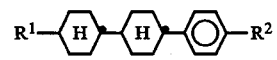  II14

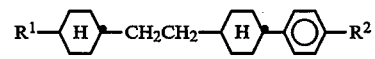  II15

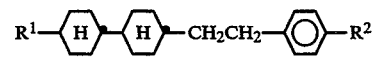  II16

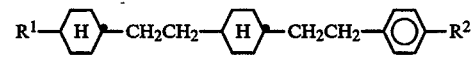  II17

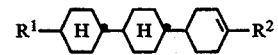  II18

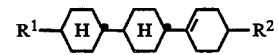  II19

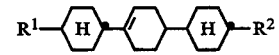  II20 in which R¹ and R² are as defined under formula I' and the 1,4-phenylene groups in II8 to II17 may each, independently of one another, also be monosubstituted or polysubstituted by fluorine.

Furthermore, component A preferably additionally contains one or more compounds selected from the group comprising II21 to II25

  II21

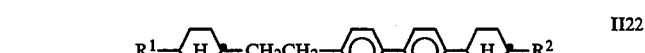  II22

  II23

  II24

  II25 in which R¹ and R² are as defined under formula I' and the 1,4-phenylene groups in II21 ro II25 may also each, independently of one another, be monosubstituted or polysubstituted by fluorine.

Finally, preferred mixtures of this type are those in which component A contains one or more compounds selected from the group comprising II26 and II27:

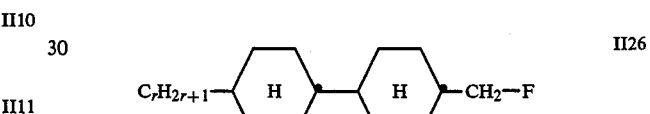  II26

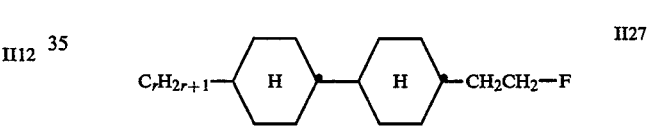  II27 in which $C_rH_{2r+1}$ is a straight-chain alkyl group having up to 7 carbon atoms.

In some cases, the addition of compounds of the formula

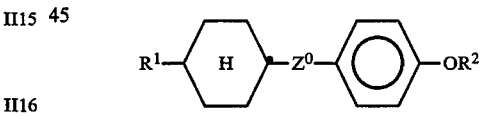

in which
R¹ and R² are as defined under formula I'
and
Z° is a single bond, —CH₂CH₂—,

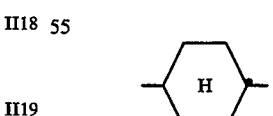

or

proves advantageous for suppressing smectic phases and improves the tilt angle, although this may reduce the specific resistance. In order to achieve parameter combinations which are ideal for the application, a person skilled in the art can easily determine whether and, if yes, in what amount these compounds may be added. Normally, less than 15%, in particular 5–10%, are used.

Preference is also given to liquid-crystal mixtures which contain one ore more compounds selected from the group comprising III' and VI':

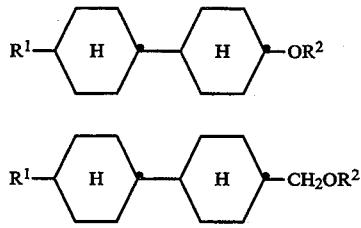

in which $R^1$ and $R^2$ are as defined under formula I'.

The type and amount of the polar compounds having positive dielectric anisotropy is not crucial per se. A person skilled in the art can use simple routine experiments to select suitable materials from a wide range of known and, in many cases, also commercially available components and base mixtures. The media according to the invention preferably contain one or more compounds of the formula I"

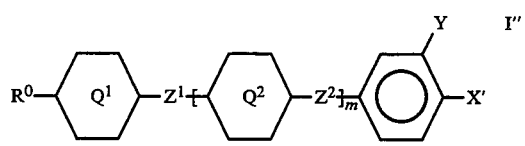

in which $Z^1$, $Z^2$ and m are as defined under the formula I', $Q^1$ and $Q^2$ are each, independently of one another, 1,4-phenylene, trans-1,4-cyclohexylene or 3-fluoro-1,4-phenylene-, and one of the radicals $Q^1$ and $Q^2$ is alternatively trans-1,3-dioxane-2,5-diyl, pyrimidine-2,5-diyl, pyrimidine-2,5-diyl or 1,4-cyclohexenylene, R° is n-alkyl, n-alkenyl, n-alkoxy or n-oxaalkyl, in each case having up to 9 carbon atoms, Y is H or F and X' is CN, halogen, $CF_3$, $OCF_3$ or $OCHF_2$.

In a preferred embodiment, the media according to the invention for STN or TN applications are based on compounds of the formula I" in which X' is CN. It goes without saying that smaller or larger proportions of other compounds of the formula I" (X'≠CN) are also possible. For MLC applications, the media according to the invention preferably contain only up to about 10% of nitriles of the formula I" (but preferably no nitriles of the formula I", but instead compounds of the formula I' where X'=halogen, $CF_3$, $OCF_3$ or $OCHF_2$). These media are preferably based on the compounds of the formulae II to XII.

The construction of the STN and MLC displays according to the invention from polarizers, electrode base plates and electrodes with surface treatment corresponds to the construction which is conventional for displays of this type. The term conventional construction here is widely drawn and also covers all derivatives and modifications of the MLC display, in particular also matrix display elements based on poly-Si TFTs or MIMs.

An essential difference between the displays according to the invention and those customary hitherto based on the twisted nematic cell is, however, the choice of liquid-crystal parameters in the liquid-crystal layer.

The liquid-crystal mixtures which can be used according to the invention are prepared in a manner which is conventional per se. In general, the desired amount of the components used in the lesser amount is dissolved in the components making up the principal constituent, expediently at elevated temperature. It is also possible to mix solutions of the components in an organic solvent, for example in acetone, chloroform or methanol, and, after thorough mixing, to remove the solvent again, for example by distillation.

The dielectrics may also contain other additives known to those skilled in the art and described in the literature. For example, 0–15% of pleochroic dyes or chiral dopes can be added.

C denotes a crystalline phase, S a smectic phase, $S_B$ a smectic B phase, N a nematic phase and I the isotropic phase.

$V_{10}$ denotes the voltage for 10% transmission (view angle perpendicular to the plate surface). $t_{on}$ denotes the switch-on time and $t_{off}$ the switch-off time at an operating voltage corresponding to 2.5 times the value of $V_{10}$. $\Delta n$ denotes the optical anisotropy and no the refractive index. $\Delta \epsilon$ denotes the dielectric anisotropy ($\Delta \epsilon = \epsilon_{||} - \epsilon_{\perp}$, where $\epsilon_{||}$ is the dielectric constant parallel to the longitudinal molecular axes and $\epsilon_{\perp}$ is the dielectric constant perpendicular thereto). The electro-optical data were measured in a TN cell at the 1st minimum (i.e. at a d n value of 0.5) at 20° C., unless expressly stated otherwise. The optical data were measured at 20° C., unless expressly stated otherwise.

The examples below are intended to illustrate the invention without representing a limitation. Above and below all temperatures are given in °C. The percentages are percent by weight.

In the present application and in the examples below, the structures of the liquid-crystal compounds are indicated by acronyms, with the transformation into chemical formulae taking place in accordance with Tables A and B below. All radicals $C_nH_{2n+1}$ are straight-chain alkyl radicals containing n or m carbon atoms. The coding in Table B is self-evident. In Table A, only the acronym for the base structure is given. In individual cases, the acronym for the base structure is followed, separated by a hyphen, by a code for the substituents $R^1$, $R^2$, $L^1$, $L^2$ and $L^3$:

| Code for $R^1$, $R^2$, $L^1$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $OC_mH_{2m+1}$ | H | H | H |
| nO.m | $C_nH_{2n+1}$ | $C_mH_{2m+1}$ | H | H | H |
| n | $C_nH_{2n+1}$ | CN | H | H | H |
| nN.F | $C_nH_{2n+1}$ | CN | H | H | H |
| nF | $C_nH_{2n+1}$ | F | H | H | H |

-continued

| Code for R¹, R², L¹, L², L³ | R¹ | R² | L¹ | L² | L³ |
|---|---|---|---|---|---|
| nOF | $C_nH_{2n+1}$ | F | H | H | H |
| nCl | $C_nH_{2n+1}$ | Cl | H | H | H |
| nF.F | $C_nH_{2n+1}$ | F | H | F | H |
| nOmFF | $C_nH_{2n+1}$ | $OC_mH_{2m+1}$ | F | F | H |
| nmF | $C_nH_{2n+1}$ | $OC_mH_{2m+1}$ | F | H | H |
| nCF₃ | $C_nH_{2n+1}$ | $CF_3$ | H | H | H |
| nOCF₃ | $C_nH_{2n+1}$ | $OCF_3$ | H | H | H |
| nOCF₂ | $C_nH_{2n+1}$ | $OCHF_2$ | H | H | H |
| nS | $C_nH_{2n+1}$ | NCS | H | H | H |
| rVsN | $C_nH_{2n+1}-CH=CH-C_sH_{2s}-$ | CN | H | H | H |
| rEsN | $C_nH_{2n+1}-O-C_2H_{2s}-$ | CN | H | H | H |
| nNF | $C_nH_{2n+1}$ | CN | F | H | H |
| nAm | $C_nH_{2n+1}$ | $COOC_mH_{2m+1}$ | H | H | H |
| nF.F.F | $C_nH_{2n+1}$ | F | H | F | F |
| nF.F.F.F. | $C_nH_{2n+1}$ | F | F | F | F |

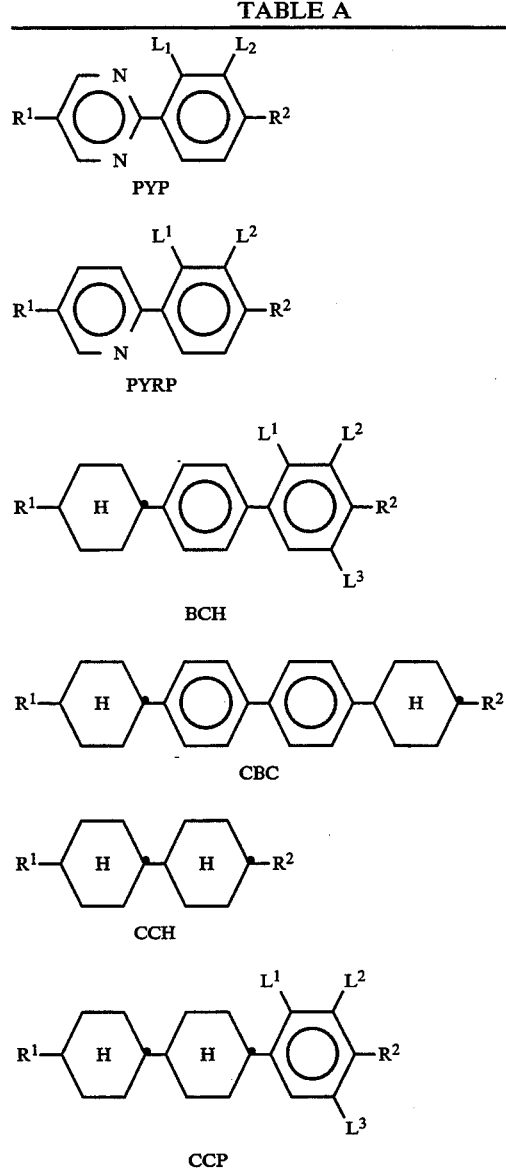

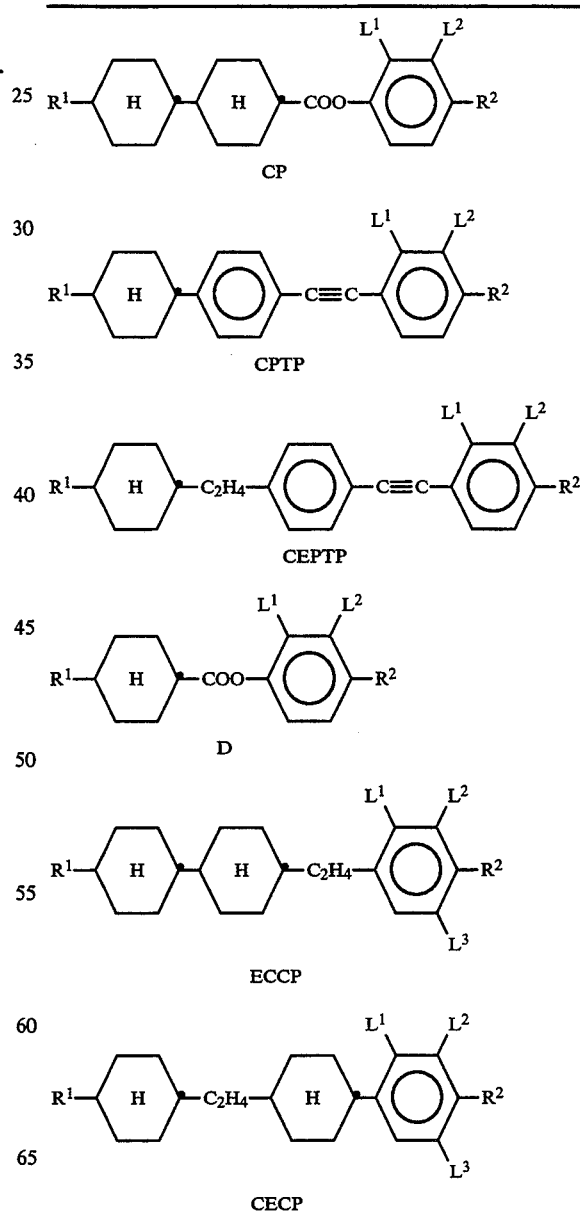

TABLE A-continued
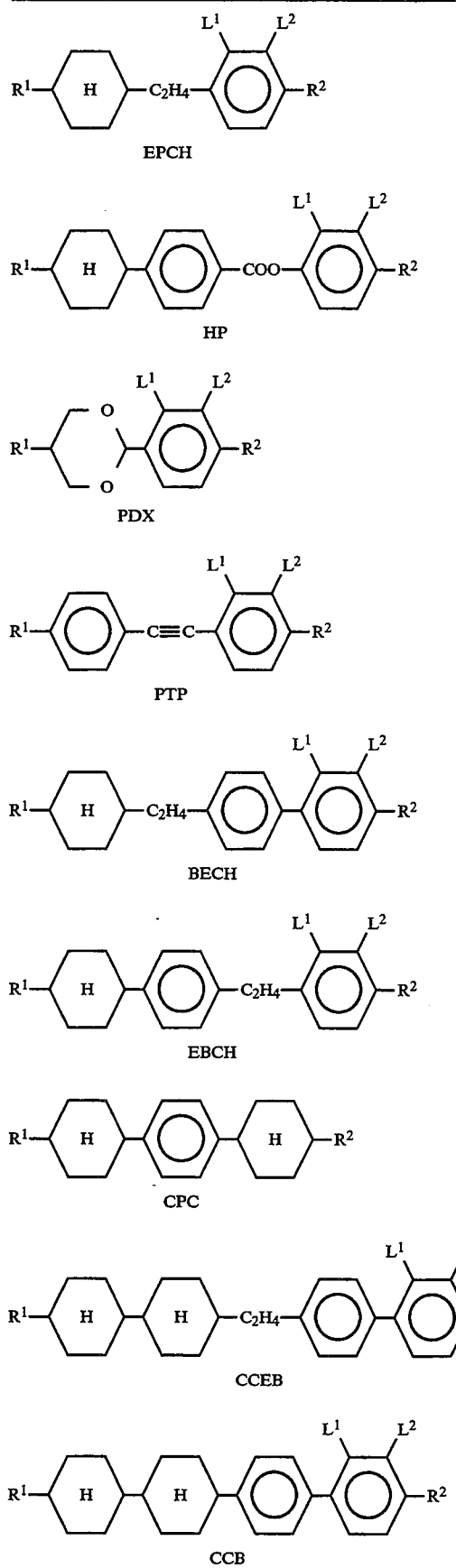
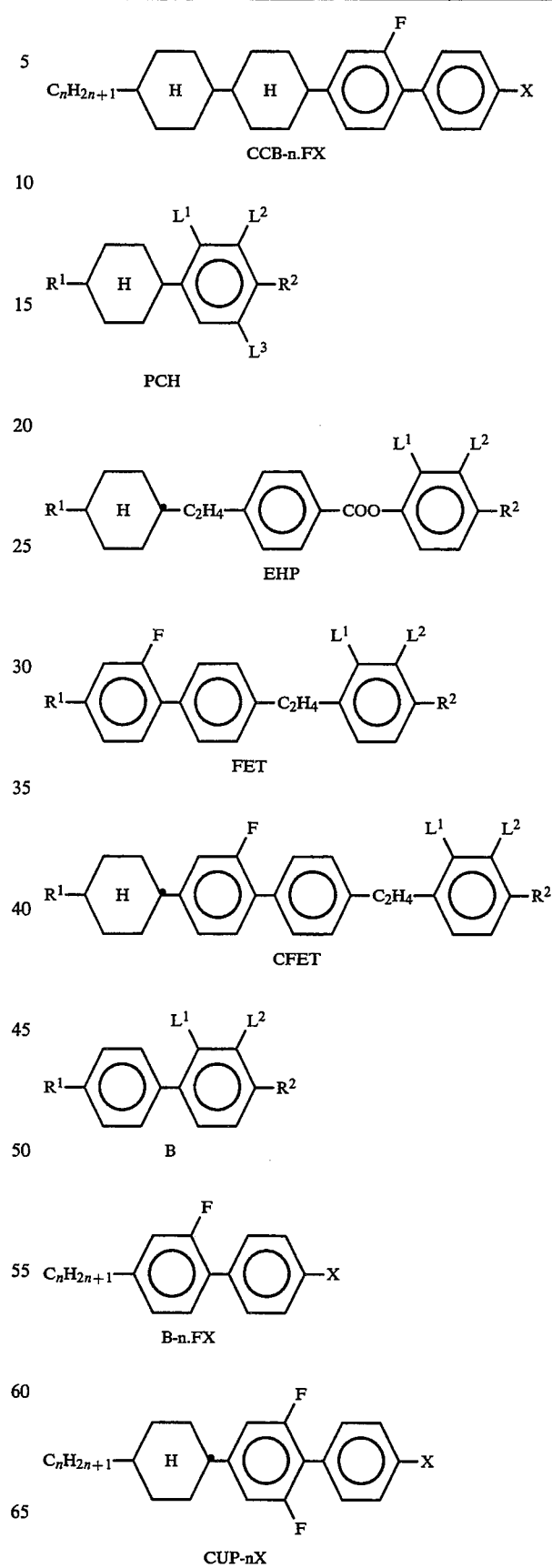

TABLE A-continued
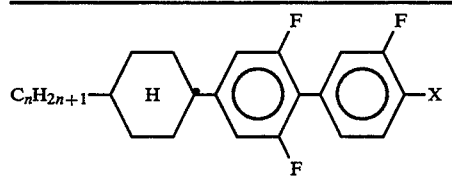
CUP-nX.F
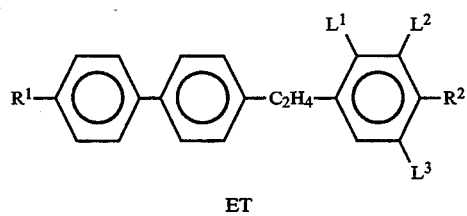
ET
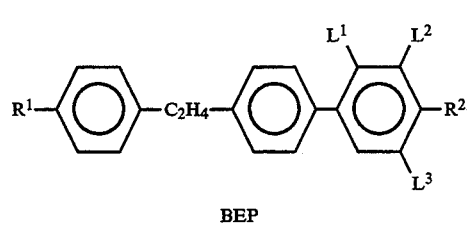
BEP
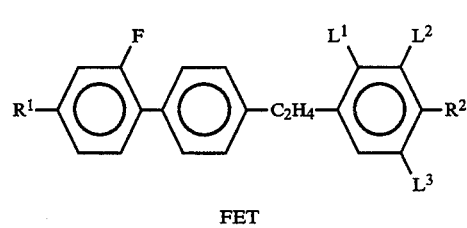
FET
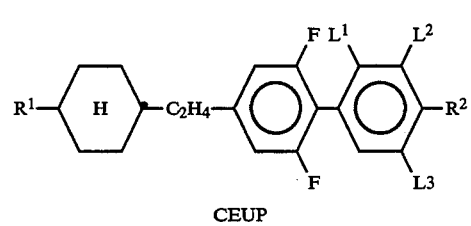
CEUP
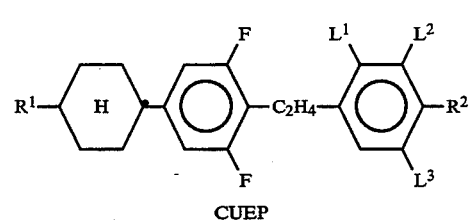
CUEP
TABLE B
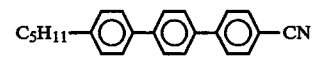
T15
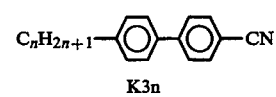
K3n
TABLE B-continued
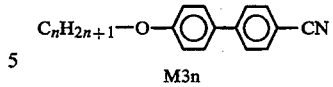
M3n
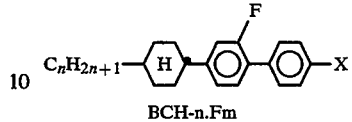
BCH-n.Fm
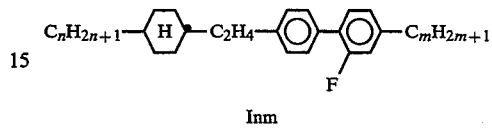
Inm
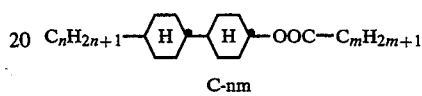
C-nm
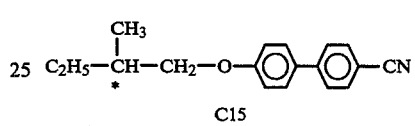
C15
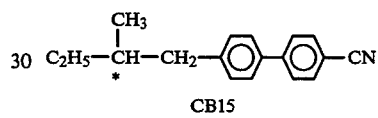
CB15
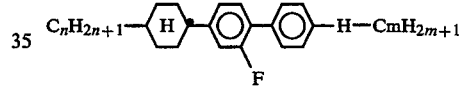
CBC-nmF
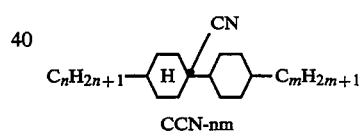
CCN-nm
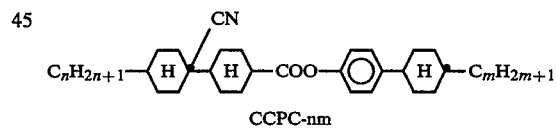
CCPC-nm
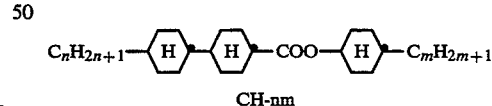
CH-nm
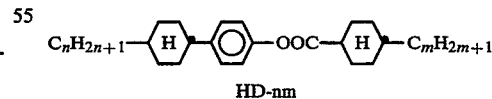
HD-nm
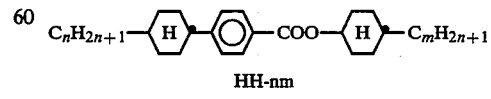
HH-nm
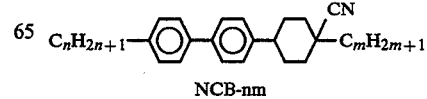
NCB-nm

TABLE B-continued

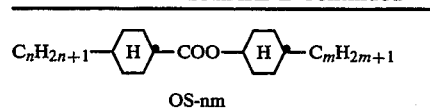
OS-nm

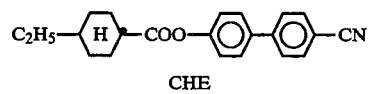
CHE

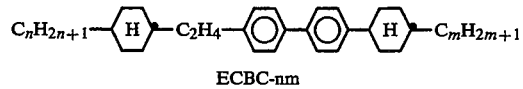
ECBC-nm

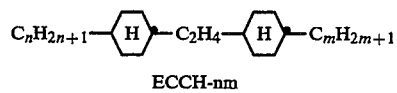
ECCH-nm

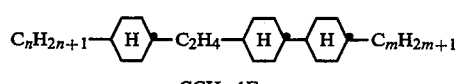
CCH-n1Em

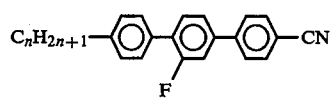
T-nFn

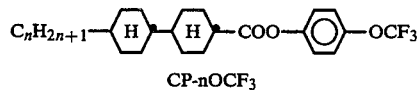
CP-nOCF3

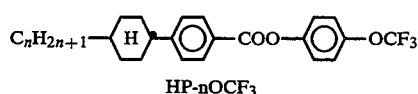
HP-nOCF3

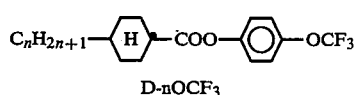
D-nOCF3

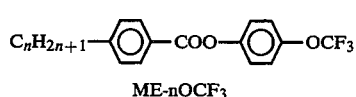
ME-nOCF3

EXAMPLE 1

| | |
|---|---|
| PCH-6F | 13.0 |
| PCH-7F | 7.0 |
| CCP-20CF3 | 10.0 |
| CCP-30CF3 | 11.0 |
| CCP-40CF3 | 10.0 |
| CCP-50CF3 | 12.0 |
| BCH-3F.F | 12.0 |
| BCH-5F.F | 12.0 |
| CP-30CF3 | 6.0 |
| CP-50CF3 | 7.0 |

EXAMPLE 2

| | |
|---|---|
| PCH-6F | 13.0 |
| PCH-7F | 7.0 |
| CCP-20CF3 | 10.0 |
| CCP-30CF3 | 11.0 |
| CCP-40CF3 | 10.0 |
| CCP-50CF3 | 12.0 |
| BCH-3F.F | 12.0 |
| BCH-5F.F | 12.0 |
| HP-30CF3 | 6.0 |
| HP-50CF3 | 7.0 |

EXAMPLE 3

| | |
|---|---|
| ME30CF3 | 5.0 |
| PCH-6F | 8.0 |
| PCH-7F | 7.0 |
| CCP-20CF3 | 10.0 |
| CCP-30CF3 | 11.0 |
| CCP-40CF3 | 10.0 |
| CCP-50CF3 | 12.0 |
| BCH-3F.F | 12.0 |
| BCH-5F.F | 12.0 |
| CP-30CF3 | 6.0 |
| CP-50CF3 | 7.0 |

EXAMPLE 4

| | |
|---|---|
| PCH-5F | 5.0 |
| PCH-6F | 13.0 |
| PCH-7F | 7.0 |
| CCP-20CF3 | 10.0 |
| CCP-30CF3 | 11.0 |
| CCP-40CF3 | 10.0 |
| CCP-50CF3 | 12.0 |
| BCH-3F.F | 12.0 |
| BCH-5F.F | 12.0 |
| HP-30CF3 | 4.0 |
| HP-50CF3 | 4.0 |

EXAMPLE 5

| | |
|---|---|
| PCH-5F | 13.0 |
| PCH-7F | 7.0 |
| CCP-20CF3 | 8.0 |
| CCP-30CF3 | 10.0 |
| CCP-40CF3 | 8.0 |
| CCP-50CF3 | 10.0 |
| BCH-3F.F | 12.0 |
| BCH-5F.F | 12.0 |
| HP-30CF3 | 5.0 |
| HP-50CF3 | 5.0 |
| CP-30CF3 | 5.0 |
| CP-50CF3 | 5.0 |

EXAMPLE 6

| | |
|---|---|
| PCH-5F | 5.0 |
| PCH-6F | 13.0 |
| PCH-7F | 7.0 |
| CCP-20CF3 | 10.0 |
| CCP-30CF3 | 11.0 |
| CCP-40CF3 | 10.0 |
| CCP-50CF3 | 12.0 |
| BCH-3F.F | 12.0 |
| BCH-5F.F | 12.0 |
| CP-30CF3 | 4.0 |
| CP-50CF3 | 4.0 |

EXAMPLE 7

| | |
|---|---|
| D-30CF3 | 5.0 |

-continued

| | | |
|---|---|---|
| PCH-6F | 8.0 | |
| PCH-7F | 7.0 | |
| CCP-20CF3 | 10.0 | |
| CCP-30CF3 | 11.0 | |
| CCP-40CF3 | 10.0 | |
| CCP-50CF3 | 12.0 | |
| BCH-3F.F | 12.0 | |
| BCH-5F.F | 12.0 | |
| CP-30CF3 | 6.0 | |
| CP-50CF3 | 7.0 | |

EXAMPLE 8

| | |
|---|---|
| PCH-5F | 7.0 |
| PCH-6F | 7.0 |
| PCH-7F | 6.0 |
| CP-30CF3 | 10.0 |
| CP-50CF3 | 10.0 |
| CCP-20CF3 | 10.0 |
| CCP-30CF3 | 10.0 |
| CCP-40CF3 | 9.0 |
| CCP-50CF3 | 10.0 |
| ECCP-3F.F | 11.0 |
| ECCP-5F.F | 10.0 |

EXAMPLE 9

| | |
|---|---|
| PCH-5F | 10.0 |
| PCH-6F | 8.0 |
| PCH-7F | 6.0 |
| CCP-20CF3 | 8.0 |
| CCP-30CF3 | 12.0 |
| CCP-40CF3 | 7.0 |
| CCP-50CF3 | 11.0 |
| BCH-3F.F | 12.0 |
| BCH-5F.F | 10.0 |
| CP-30CF3 | 5.0 |
| CP-50CF3 | 5.0 |
| CBC-33F | 2.0 |
| CBC-53F | 2.0 |
| CBC-55F | 2.0 |

EXAMPLE 10

| | |
|---|---|
| PCH-5F | 3.0 |
| PCH-6F | 3.0 |
| PCH-7F | 3.0 |
| CCP-20CF3 | 7.0 |
| CCP-30CF3 | 8.0 |
| CCP-40CF3 | 7.0 |
| CCP-50CF3 | 8.0 |
| CP-30CF3 | 6.0 |
| CP-50CF3 | 6.0 |
| ECCP-30CF3 | 6.0 |
| ECCP-50CF3 | 6.0 |
| ECCP-3F.F | 8.0 |
| ECCP-5F.F | 8.0 |
| CCH-301 | 11.0 |
| CCH-303 | 10.0 |

EXAMPLE 11

| | |
|---|---|
| PCH-5F | 7.0 |
| PCH-6F | 7.0 |
| PCH-7F | 6.0 |
| CP-3F | 10.0 |
| CP-5F | 10.0 |
| CCP-20CF3 | 10.0 |
| CCP-30CF3 | 10.0 |
| CCP-40CF3 | 9.0 |
| CCP-50CF3 | 10.0 |
| CP-30CF3 | 11.0 |
| CP-50CF3 | 10.0 |

EXAMPLE 12

| | |
|---|---|
| PCH-5F | 4.0 |
| PCH-6F | 4.0 |
| CCH-301 | 10.0 |
| CCH-303 | 10.0 |
| CP-30CF3 | 10.0 |
| CP-50CF3 | 10.0 |
| CCP-20CF3 | 11.0 |
| CCP-30CF3 | 11.0 |
| CCP-40CF3 | 9.0 |
| CCP-50CF3 | 10.0 |
| EHP-3F.F | 6.0 |
| EHP-3F.F | 6.0 |

EXAMPLE 13

| | |
|---|---|
| PCH-6F | 9.0 |
| PCH-6F | 7.0 |
| PCH-7F | 6.0 |
| CP-3F | 7.0 |
| CP-5F | 7.0 |
| CCP-20CF3 | 9.0 |
| CCP-30CF3 | 9.0 |
| CCP-40CF3 | 8.0 |
| CCP-50CF3 | 9.0 |
| CP-30CF3 | 10.0 |
| CP-50CP3 | 9.0 |
| CCH-301 | 10.0 |

The properties of the Examples 1–13 are given in the following table:

| Example | 1 | 2 | 3 | 4 | 5 | 6 | 7 | 8 | 9 | 10 | 11 | 12 | 13 |
|---|---|---|---|---|---|---|---|---|---|---|---|---|---|
| S → N [°C.] | — | <−20 | <+20 | — | <−20 | <0 | <−20 | — | — | — | — | — | — |
| Clearing point [°C.] | +95 | +92 | +98 | +81 | +96 | +83 | 99 | 101 | 79 | 76 | 118 | 101 | 95 |
| Viscosity [mm$^2$S$^{-1}$] 20° C. | 15 | 16 | — | 14 | 16 | 14 | 15 | — | 14 | 13 | — | — | — |
| Viscosity [mm$^2$S$^{-1}$] 0° C. | 41 | cryst. | — | 37 | 42 | 37 | 42 | — | — | — | — | — | — |
| Viscosity [mm$^2$S$^{-1}$] −20° C. | 180 | — | — | 147 | 0.5 < kr < 1 h | 153 | — | — | — | — | — | — | — |
| Viscosity [mm$^2$S$^{-1}$] −30° C. | cryst. | — | — | smekt. | — | cryst. | cryst. | — | — | — | — | — | — |

-continued

| Example | 1 | 2 | 3 | 4 | 5 | 6 | 7 | 8 | 9 | 10 | 11 | 12 | 13 |
|---|---|---|---|---|---|---|---|---|---|---|---|---|---|
| $\Delta n$ (589 nm, 20° C.) | +0.0940 | +0.0986 | +0.0991 | +0.0943 | +0.0911 | 0.0911 | 0.0968 | 0.0768 | 0.097 | 0.078 | 0.0786 | 0.0773 | 0.0732 |
| ne (589 nm, 20° C.) | 1.5706 | 1.5775 | 1.5949 | 1.5734 | 1.5768 | 1.5687 | — | 1.5483 | — | — | 1.5504 | 1.5468 | 1.5449 |
| no (589 nm, 20° C.) | 1.4765 | 1.4789 | 1.4758 | 1.4791 | 1.4777 | 1.4776 | — | 1.4715 | — | — | — | — | — |
| $V_{(10,0,20)}$ d.$\Delta n$ = 0,4 μm | 1.73 | 1.59 | 1.72 | 1.58 | 1.68 | 1.67 | 1.78 | 2.28 | — | — | 2.26 | 2.22 | 2.12 |
| $V_{(50,0,20)}$ | 2.20 | 2.02 | 2.19 | 2.00 | 2.13 | 2.11 | 2.28 | 2.70 | — | — | 2.68 | 2.62 | 2.55 |
| $V_{(90,0,20)}$ | 2.87 | 2.62 | 2.87 | 2.59 | 2.81 | 2.74 | 2.99 | 3.30 | — | — | 3.27 | 3.21 | 3.13 |
| HR (100° C.)/% | 95.0 | 96.9 | 94.0 | 95.5 | 90.0 | 95.5 | 90.2 | | | | | | |
| HR (20° C.)/% | 98.3 | 98.6 | 98.3 | 98.5 | 98.0 | 98.5 | 98.2 | — | — | — | — | — | — |
| HR (20° C.)/% | — | — | — | — | — | — | 97.4 | — | — | — | — | — | — |

EXAMPLE 14

A liquid-crystal composition consisting of

| | |
|---|---|
| PCH-5F | 8.0% |
| PCH-6F | 8.0% |
| CP-3F | 5.0% |
| CP-5F | 5.0% |
| BCH-3F.F | 7.0% |
| BCH-5F.F | 7.0% |
| CCP-20CF3 | 8.0% |
| CCP-30CF3 | 7.0% |
| CCP-40CF3 | 7.0% |
| CCP-50CF3 | 7.0% |
| ECCP-3F.F | 9.0% |
| ECCP-5F.F | 8.0% |
| ECCP-30CF3 | 7.0% |
| ECCP-50CF3 | 7.0% | shows the following properties:

| | |
|---|---|
| Clearing point | +102° C. |
| Viscosity (+20° C.) | 16 mm² s⁻¹ |
| Optical anisotropy (20° C., 589 nm) | $\Delta n$ +0.0876 |
| V(10,0,20) | 2.10 (1st) v |

EXAMPLE 15

| PCH-5F | 7.6 | S < −10 N 82 | I |
|---|---|---|---|
| PCH-6F | 7.6 | V₁₀ | 2.25 Volt |
| PCH-7F | 7.6 | $\Delta n$ | 0.1210 |
| FET-3F | 5.7 | | |
| FET-5F | 3.8 | | |
| CFET-3F.F | 7.6 | | |
| CFET-5F | 8.5 | | |
| BCH-3F.F.F | 13.3 | | |
| BCH-5F.F.F | 12.3 | | |
| BCH-52F | 7.6 | | |
| ECCP-30CF3 | 6.7 | | |
| CBC-33F | 1.9 | | |
| CBC-53F | 2.9 | | |
| CBC-55F | 1.9 | | |
| CP-4F | 5.0 | | |

EXAMPLE 16

| PCH-5F | 17.0 | S < −30 N 111 | I |
|---|---|---|---|
| CCP-20CF3 | 15.0 | $\Delta n$ | 0.0894 |
| CCP-30CF3 | 12.0 | Viscosity (20° C.): | 15 mm² s⁻¹ |
| CCP-40CF3 | 12.0 | V₁₀ | 2.26 Volt |
| CCP-50CF3 | 12.0 | | |
| CP-3F | 10.0 | | |
| CP-5F | 10.0 | | |
| PCH-301 | 7.0 | | |
| CPTP-301 | 5.0 | | |

EXAMPLE 17

A liquid crystalline composition consisting of

| | |
|---|---|
| PCH-5F | 9.0 |
| PCH-6F | 6.0 |
| PCH-7F | 6.0 |
| CCP-20CF3 | 12.0 |
| CCP-30CF3 | 12.0 |
| CCP-40CF3 | 10.0 |
| CCP-50CF3 | 12.0 |
| BCH-3F.F | 12.0 |
| BCH-3F.F | 10.0 |
| CP-3F | 6.0 |
| CP-5F | 5.0 | exhibits a broad nematic phase range.

EXAMPLE 18

A liquid crystalline composition consisting of

| | |
|---|---|
| PCH-5F | 7.0 |
| PCH-7F | 7.0 |
| CCP-20CF3 | 6.0 |
| CCP-30CF3 | 6.0 |
| CCP-40CF3 | 6.0 |
| CCP-50CF3 | 6.0 |
| CP-20CF3 | 5.0 |
| CP-30CF3 | 5.0 |
| CP-40CF3 | 5.0 |
| CP-50CF3 | 5.0 |
| ECCP-3F.F | 9.0 |
| ECCP-5F.F | 9.0 |
| CCH-303 | 12.0 |
| CCH-501 | 12.0 | shows the following properties:

| | |
|---|---|
| Clearing point: | +86° C. |
| Optical anisotropy: (20° C., 589 nm) | $\Delta n$ +0.0666 |
| V₁₀,₀,₂₀ | 2.10 (1st) V |

All compositions (Examples 1 to 18) shown above show HR₂₀/HRo ≧98% and are thus highly valuable as mixtures for active matrix displays.

HR₂₀: Voltage eholding ratio after 20 hours exposure to UV-light (280–400 nm, 12 mW cm⁻²)

HRo: Voltage holding ratio before exposure to UV-light

EXAMPLE 19

A liquid crystalline composition consisting of

| | |
|---|---|
| PCH-3 | 8.0 |
| PCH-4 | 9.0 |
| PCH-5 | 5.0 |
| PCH-302 | 19.0 |
| PCH-304 | 13.0 |
| CP-30CF3 | 5.0 |
| CP-50CF3 | 5.0 |
| ECCP-3F | 6.0 |
| CP-33 | 7.0 |
| CP-35 | 8.0 |
| CP-43 | 8.0 |
| CP-45 | 7.0 | shows the following properties:

| | |
|---|---|
| Clearing point: | +92° C. |
| Optical anisotropy: | $\Delta n$ 0.0951 |
| $V_{10,0,20}$: | 2.22 V |

EXAMPLE 20

| | |
|---|---|
| PCH-5F | 3.0 |
| PCH-6F | 3.0 |
| PCH-7F | 3.0 |
| CCP-20CF3 | 6.0 |
| CCP-30CF3 | 6.0 |
| CCP-40CF3 | 6.0 |
| CCP-50CF3 | 6.0 |
| ECCP-30CF3 | 3.0 |
| ECCP-50CF3 | 3.0 |
| ECCP-3F.F | 8.0 |
| ECCP-5F.F | 8.0 |
| CH-33 | 4.0 |
| CH-35 | 4.0 |
| CCH-301 | 11.0 |
| CCH-303 | 11.0 |
| CCH-501 | 10.0 |
| CP-30CF3 | 3.0 |
| CP-50CF3 | 3.0 |
| Clearing point: | 88° C. |
| $\Delta n$: | 0.0651 |
| $V_{10,0,20}$: | 2.75 V (1st Min.) |

EXAMPLE 21

| | |
|---|---|
| PCH-5F | 7.0 |
| PCH-7F | 7.0 |
| CCP-20CF3 | 6.0 |
| CCP-30CF3 | 6.0 |
| CCP-40CF3 | 6.0 |
| CCP-50CF3 | 6.0 |
| CP-20CF3 | 5.0 |
| CP-30CF3 | 5.0 |
| CP-40CF3 | 5.0 |
| CP-50CF3 | 5.0 |
| ECCP-3F.F | 9.0 |
| ECCP-5F.F | 9.0 |
| CCH-303 | 12.0 |
| CCH-501 | 12.0 |
| Clearing point: | 86° C. |
| $\Delta n$: | 0.0666 |
| $V_{10,0,20}$: | 2.14 V (1st Min.) |

EXAMPLE 22

A liquid crystal medium is prepared consisting of:

| | |
|---|---|
| K6 | 6.0 |
| K9 | 7.0 |
| K15 | 8.0 |
| PCH-3 | 23.0 |
| PCH-302 | 7.0 |
| CP-30CF3 | 6.0 |
| CP-50CF3 | 6.0 |
| PTP-102 | 5.0 |
| PTP-201 | 5.0 |
| ECCP-3 | 6.0 |
| ECCP-31 | 6.0 |
| ECCP-32 | 5.0 |
| ECCP-33 | 5.0 |
| BCH-32 | 5.0 | and exhibits a broad nematic phase range and a short switching time in a STN display.

We claim:

1. A liquid-crystalline medium based on a mixture of polar compounds having positive dielectric anisotropy, which comprises one or more compounds of the formula I

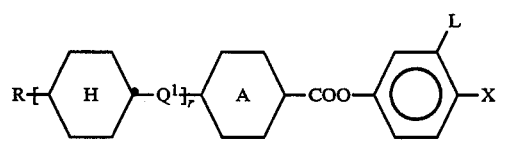

in which r is 0 or 1, $Q^1$ is —CH$_2$CH$_2$— or a single bond, A is 1,4-phenylene or trans—1,4-cyclohexylene, L is H or F, R is alkyl, alkoxy, oxaalkyl, fluoroalkyl or alkenyl, in each case having 1 to 7 carbon atoms and X is F, OCF$_3$ or OCF$_2$H, one or more compounds selected from the group consisting of the formulae II, II and IV:

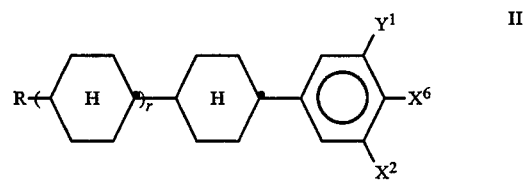

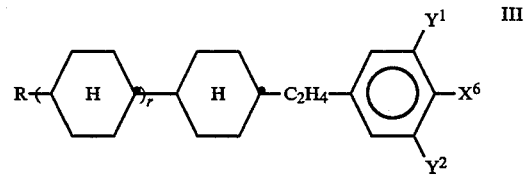

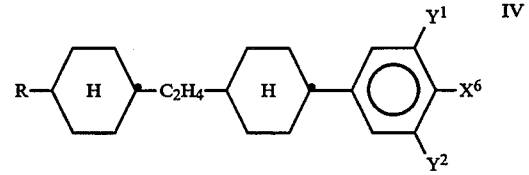

in which R and r are independently as defined above and the other radicals are as defined below:

X$^6$: F, Cl, OCF$_3$ or OCHF$_2$,

Y$^1$ and Y$^2$: independently of one another, H or F, one or more compounds selected from the group consisting of the formulae V to VIII:

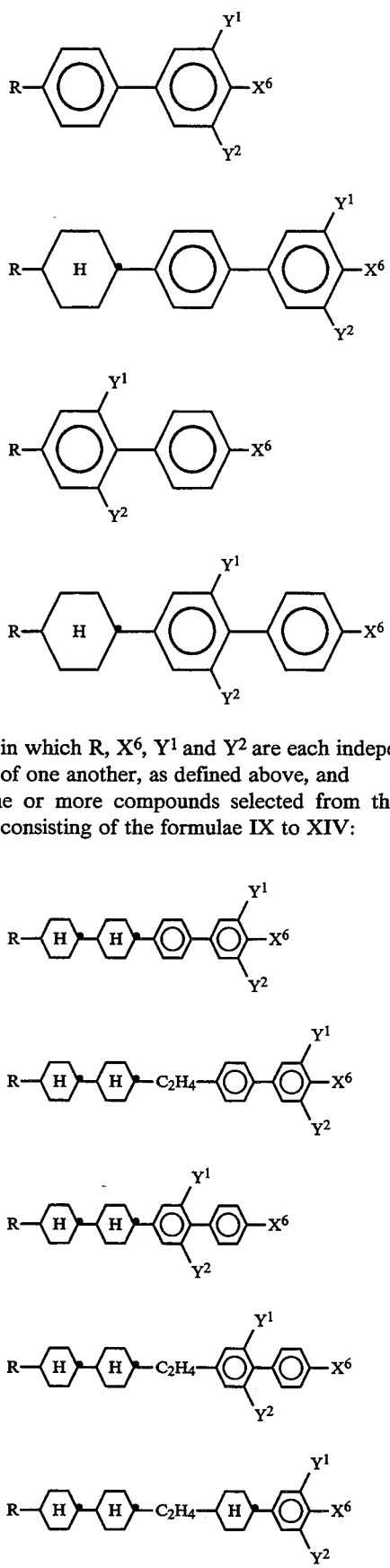

in which R, $X^6$, $Y^1$ and $Y^2$ are each independently of one another, as defined above, and
one or more compounds selected from the group consisting of the formulae IX to XIV:

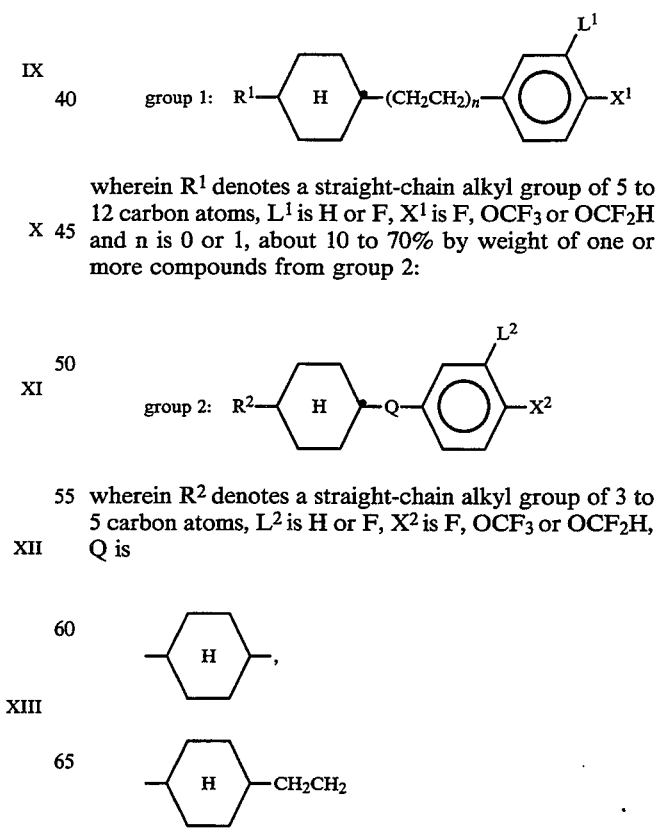

in which R, $X^6$, $Y^1$ and $Y^2$ are each, independently of one another, as defined above.

2. Medium according to claim 1, wherein the proportion of compounds of the formulae I to IV together is at least 50% by weight in the total mixture.

3. Medium according to claim 1, wherein the proportion of compounds of formula I is from 10 to 50% by weight in the total mixture.

4. Medium according to claim 1, wherein the proportion of compounds of the formulae II to IV is from 30 to 70% by weight in the total mixture.

5. Medium according to claim 1 which consists essentially of compounds selected from the group consisting of the formulae I to XIV.

6. Electrooptical liquid-crystal display containing a liquid-crystalline medium according to claim 1.

7. The liquid-crystalline medium of claim 1 which contains only up to 10% by weight of nitrile compounds.

8. The liquid-crystalline medium of claim 1 which contains no nitrile compounds.

9. The liquid-crystalline medium of claim 1 which has a viscosity of $\leq 25$ mPa.s at 20° C.

10. A liquid-crystalline medium based on terminally and laterally fluorinated compounds comprising about 10 to 25% by weight of one or more compounds from group 1:

wherein $R^1$ denotes a straight-chain alkyl group of 5 to 12 carbon atoms, $L^1$ is H or F, $X^1$ is F, $OCF_3$ or $OCF_2H$ and n is 0 or 1, about 10 to 70% by weight of one or more compounds from group 2:

wherein $R^2$ denotes a straight-chain alkyl group of 3 to 5 carbon atoms, $L^2$ is H or F, $X^2$ is F, $OCF_3$ or $OCF_2H$, Q is or

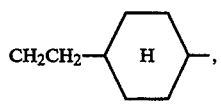

about 5 to 40% by weight of one or more compounds of the formula Ia:

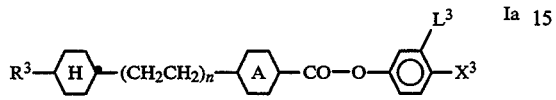

wherein $L^3$ is H or F, $X^3$ is F, $OCF_3$ or $OCF_2H$, n is 0 or 1 and

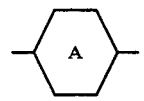

is

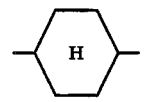

or

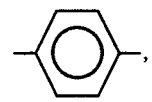

about 0 to 15% by weight of one or more compounds from group 4:

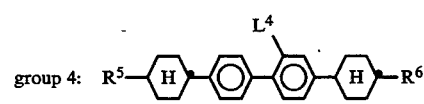

wherein $L^4$ is H or F, about 0 to 25% by weight of one or more compounds from group 5:

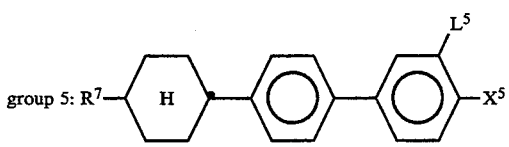

wherein $R^3$ to $R^7$ each independently denotes a straight-chain alkyl group of 1 to 12 carbon atoms, $L^5$ is H or F, $X^5$ is F, $OCF_3$ or $OCF_2H$, and about 0 to 20% by weight of one or more compounds from group 6:

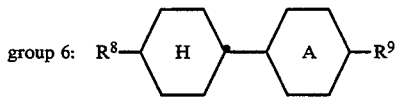

wherein

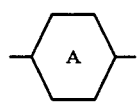

has the meaning given above for formula Ia, and $R^8$ and $R^9$ are each independently alkyl or alkoxy groups with one to 12 carbon atoms.

11. The liquid-crystalline medium of claim 10, wherein:
n in the compound(s) of group 1 is 0,
the compound(s) of group 2 are present in an amount of 15 to 25% by weight and Q in group 2 is

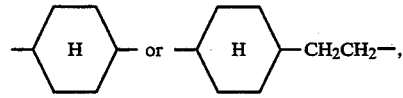

the compound(s) of formula Ia are present in an amount of 5 to 25% by weight and n in the formula Ia is 0, and
the compound(s) of group 5 are present in an amount of 1 to 5% by weight.

12. The liquid crystalline medium of claim 10, which contains 10% by weight or less of nitrile compounds.

13. The liquid crystalline medium of claim 10, which contains substantially no nitrile compounds.

14. The liquid-crystalline medium of claim 10 which has a viscosity of $\leq 25$ mPa.s at 20° C.

15. An electrooptical liquid-crystal display containing a liquid-crystalline medium according to claim 10.

16. The liquid crystalline medium of claim 10, wherein, in the one or more compounds from group 1, $R^1$ is a straight-chain alkyl group of 5–7 carbon atoms.

* * * * *